United States Patent
Niu et al.

(10) Patent No.: US 11,902,937 B2
(45) Date of Patent: Feb. 13, 2024

(54) WAKE-UP SIGNAL (WUS) DESIGN AND CONFIGURATION FOR PAGING

(71) Applicant: APPLE INC., Cupertino, CA (US)

(72) Inventors: Huaning Niu, Cupertino, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Jie Cui, Cupertino, CA (US); Manasa Raghavan, Cupertino, CA (US); Oghenekome Oteri, San Diego, CA (US); Seyed Ali Akbar Fakoorian, Cupertino, CA (US); Sigen Ye, Cupertino, CA (US); Wei Zeng, Cupertino, CA (US); Weidong Yang, San Diego, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 316 days.

(21) Appl. No.: 17/593,550

(22) PCT Filed: Oct. 15, 2020

(86) PCT No.: PCT/CN2020/121278
§ 371 (c)(1),
(2) Date: Sep. 20, 2021

(87) PCT Pub. No.: WO2022/077379
PCT Pub. Date: Apr. 21, 2022

(65) Prior Publication Data
US 2022/0312371 A1 Sep. 29, 2022

(51) Int. Cl.
*H04W 68/02* (2009.01)
*H04W 52/02* (2009.01)

(52) U.S. Cl.
CPC ....... *H04W 68/02* (2013.01); *H04W 52/0229* (2013.01)

(58) Field of Classification Search
CPC .......................... H04W 68/02; H04W 52/0229
See application file for complete search history.

(56) References Cited

U.S. PATENT DOCUMENTS

2020/0275372 A1   8/2020   Lin et al.

FOREIGN PATENT DOCUMENTS

| CN | 109923914 A | 6/2019 |
| CN | 110831125 A | 2/2020 |

(Continued)

OTHER PUBLICATIONS

LG Electronics, "Discussion on wake up signal in MTC", R1-1719875, 3GPP TSG RAN WG1 Meeting 91, Reno, Nevada, Agenda Item 6.2.5.3, Nov. 27-Dec. 1, 2017, 7 pages.

(Continued)

*Primary Examiner* — Curtis B Odom
(74) *Attorney, Agent, or Firm* — Dorsey & Whitney LLP (57) ABSTRACT

This disclosure provides details of sequence-based WUS design and signaling, also DCI-based WUS design which also serves as scheduling DCI. For sequence-based WUS there are two variants. A first is based on CSI-RS, that is relatively wide band so the sequence occupies wider band compared to SSB transmission. The second is more akin to the Secondary Synchronization Signal (SSS) type of sequence in that it occupies a narrower band over the entire bandwidth.

19 Claims, 6 Drawing Sheets

(56) References Cited

FOREIGN PATENT DOCUMENTS

| CN | 110972237 A | 4/2020 |
|----|-------------|--------|
| CN | 111727582 A | 9/2020 |
| WO | 2018212867 A1 | 11/2018 |

OTHER PUBLICATIONS

WIPO, International Search Report and Written Opinion, PCT/CN2020/121278, dated Jul. 19, 2021, 12 pages.
Apple Inc., "Potential paging enhancements for idle/inactive-mode UE power saving", R1-2006527, 3GPP TSG RAN WG1 #102-e, e-Meeting, Agenda Item 8.7.1.1, Aug. 17-28, 2020, 3 pages.

WAKE-UP SIGNAL (WUS) DESIGN AND CONFIGURATION FOR PAGING

TECHNICAL FIELD

This application relates generally to wireless communication systems, including WUS design and configuration for paging.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In 3GPP Release 17 (Rel-17), UE power saving enhancement is desired for idle and inactive modes as well as for active mode. Accordingly, there is an effort to study and specify paging enhancements to reduce unnecessary UE paging receptions, subject to no impact to legacy UEs. There is also an effort to specify a means to provide potential Tracking Reference Signal (TRS)/Channel State Information (CSI)-Reference Signal (RS) occasions available in connected mode to idle/inactive mode UEs, minimizing system overhead impact.

An idle mode UE does not have any RAN context, whereas an inactive mode UE does maintain a RAN context. Nevertheless, a typical UE procedure for receiving paging is similar for both an idle/inactive UE. First, the network configures the paging frame (PF) and paging occasion (PO) for Radio Resource Control (RRC)-Idle or RRC-inactive UE. Second, UE wakes up at certain time before the paging occasion and tries to acquire time and frequency synchronization. How long a UE wakes up before the paging occasion is a UE implementation detail. In general, a UE may wake up a few Synchronization Signal Blocks (SSBs) earlier to ensure correct paging downlink control information (DCI) and paging physical downlink shared channel (PDSCH) detection. Third, UE decodes DCI scrambled by P-Radio Network Temporary Identifier (RNTI). If DCI is detected and PDSCH is scheduled, UE proceed for PDSCH decoding for paging message. If UE does not detect DCI-scrambled by P-RNTI, UE goes back to sleep.

An issue occurs with the typical UE procedure when the UE does not get paging message. The UE still performs SSB detection and physical downlink control channel (PDCCH) decoding, which wastes UE power.

Paging indication channel was introduced in 3GPP Universal Mobile Telecommunications Service (UMTS). In 3GPP UMTS, there is a channel called paging indication. The network sends physical layer information (paging indication), like a sequence, that indicates whether UE should read the higher layer control information on the respective control channel.

In another attempt, a WUS design is described in NB-IoT Rel-15 implementations. For example, a UE decodes the PDCCH in paging occasion if WUS is detected. WUS in the form of a relatively long Zadoff-Chu (ZC) sequence is designed for reliable receiving (<1% miss detection probability). Network is configured to enable or disable WUS, which is an optional feature. If disabled, normal PDCCH monitoring for paging is needed (every paging occasion).

The design contemplates a low power receiver in the UE may be used for receiving paging indication WUS, without turn on full receiver chain for PDCCH/PDSCH receiving.

In a past RAN1 meeting (RAN1 #102-*e*), both sequence-based and DCI-based WUS were proposed. The main discussion there was about different evaluation methodology, i.e., different evaluation assumption for high and low SNR.

This disclosure provides details of sequence-based WUS design and signaling, also DCI-based WUS design which also serves as scheduling DCI. For sequence-based WUS there are two variants. A first is based on CSI-RS, and it is wide band so the sequence occupies wider band compared to SSB transmission. The second is more akin to the Secondary Synchronization Signal (SSS) type of sequence in that it occupies a narrower band over the entire bandwidth.

Figure 1:
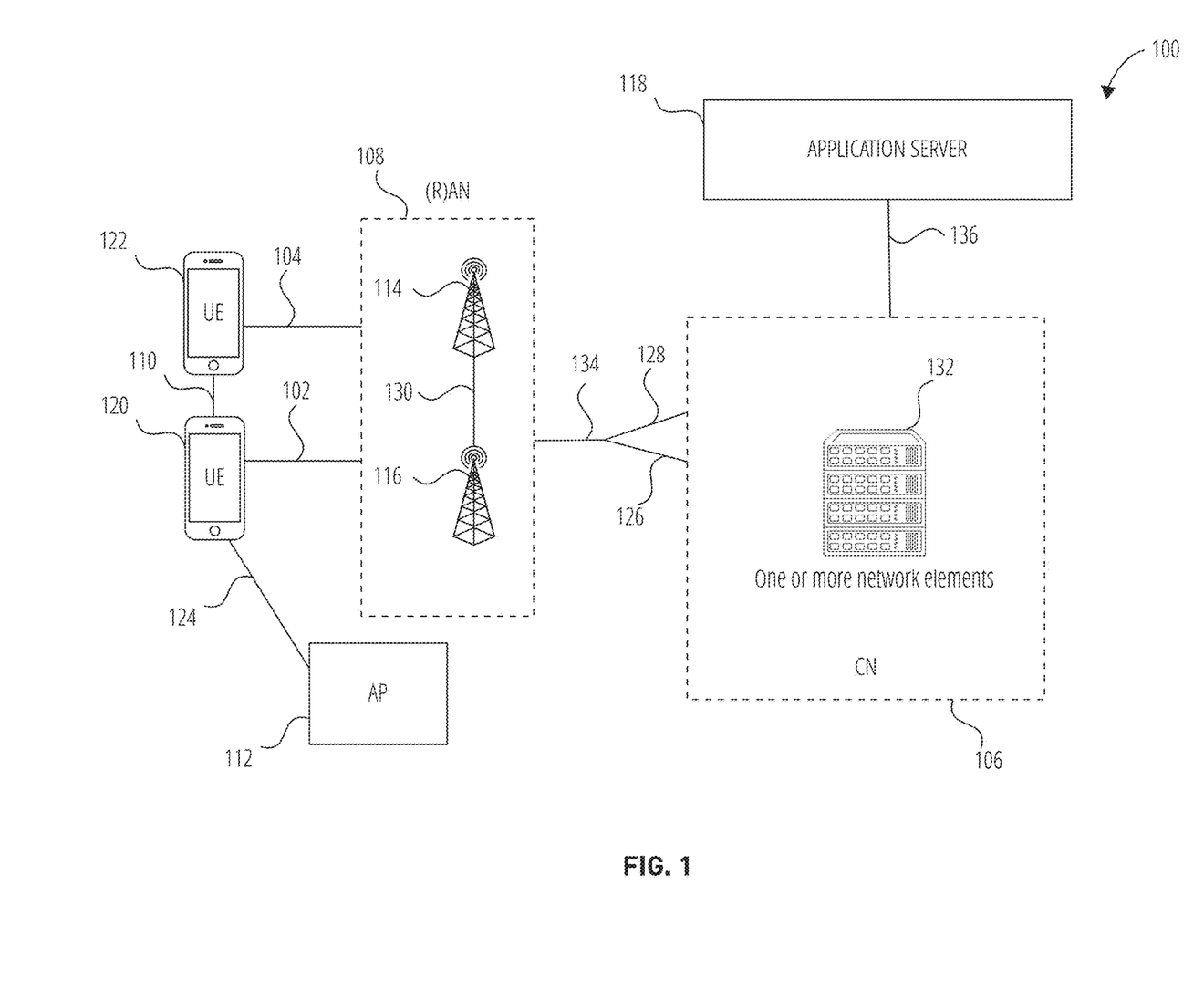
FIG. 1 is a block diagram of a system for wireless communications, in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 122 and/or the UE 120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108). In embodiments, the (R)AN 108 may be an NG RAN or a SG RAN, an E-UTRAN, or a legacy RAN, such as a UTRAN or GERAN. As used herein, the term "NG RAN" or the like may refer to a (R)AN 108 that operates in an NR or SG system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 122 and UE 120 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WLAN node," "WLAN," "WLAN Termination," "WT" or the like) via connection 124. The connection 124 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124. IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116); a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) or by a server pool in a similar manner as the CRAN/vBBUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an SGC via an NG interface (discussed infra). In V2X scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU." an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally. or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the UE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, eLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 122 and UE 120, RAN node 114 or RAN node 116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC), the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 122 from an SeNB for user data; information of PDCP PDUs that were not delivered to a UE 122; information about a current minimum desired buffer size at the Sc NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 106 is an 5GC), the interface 130 may be an Xn interface. The Xn interface is defined between two or more RAN nodes (e.g., two or more gNBs and the like) that connect to 5GC, between a RAN node 114 (e.g., a gNB) connecting to 5GC and an eNB, and/or between two eNBs connecting to 5GC (e.g., CN 106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode (e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116; and control of user plane tunnels between old (source) serving RAN node 114 to new (target) serving RAN node 116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 108 is shown to be communicatively coupled to a core network—in this embodiment, CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UMTS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and Access and Mobility Management Functions (AMFs).

In embodiments, the CN 106 may be a SG CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMEs.

In one embodiment for implementing WUS in FR1 or FR2, one CSI-RS with multiple ports is employed for a wideband WUS design based on the CSI-RS/TRS configuration. Functionality of the CSI-RS is overloaded with another type of function for WUS. Thus, the CSI-RS configuration is employed for a different purpose, with an additional CRI-RS configuration for WUS and its association is one CSI-RS port configuration per paging frame.

Figure 8:
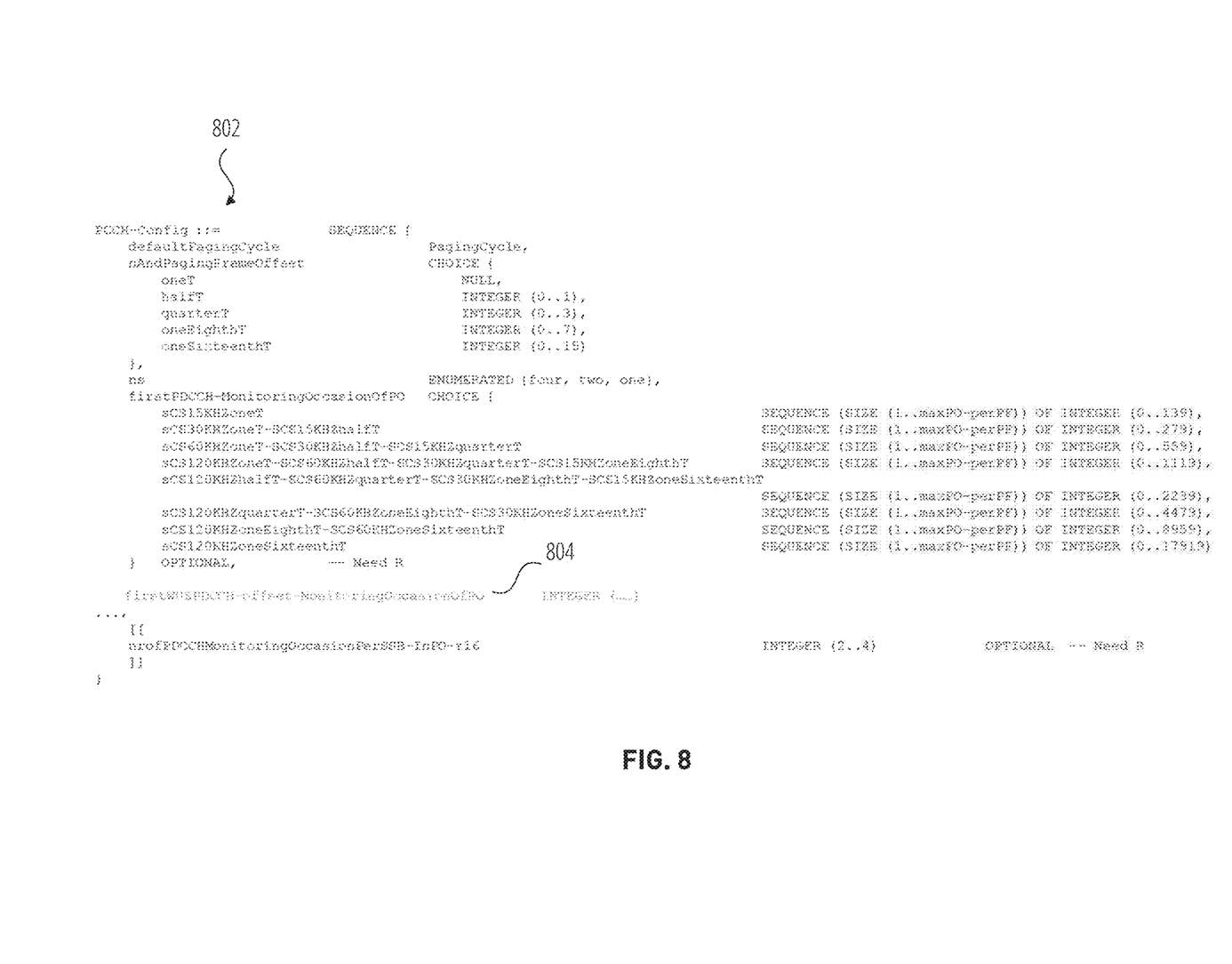
FIG. 8 is an excerpt of a PCCH-Config, according to one embodiment.

Within one paging frame, one, two, or four paging occasions are configured according to the "Ns" information element parameter in a "PCCH-Config," which is shown in FIG. 8. The Ns parameter and associated equations for determining the temporal location of a paging frame are described in 3GPP TS 38.304.

Figures 2, 3:
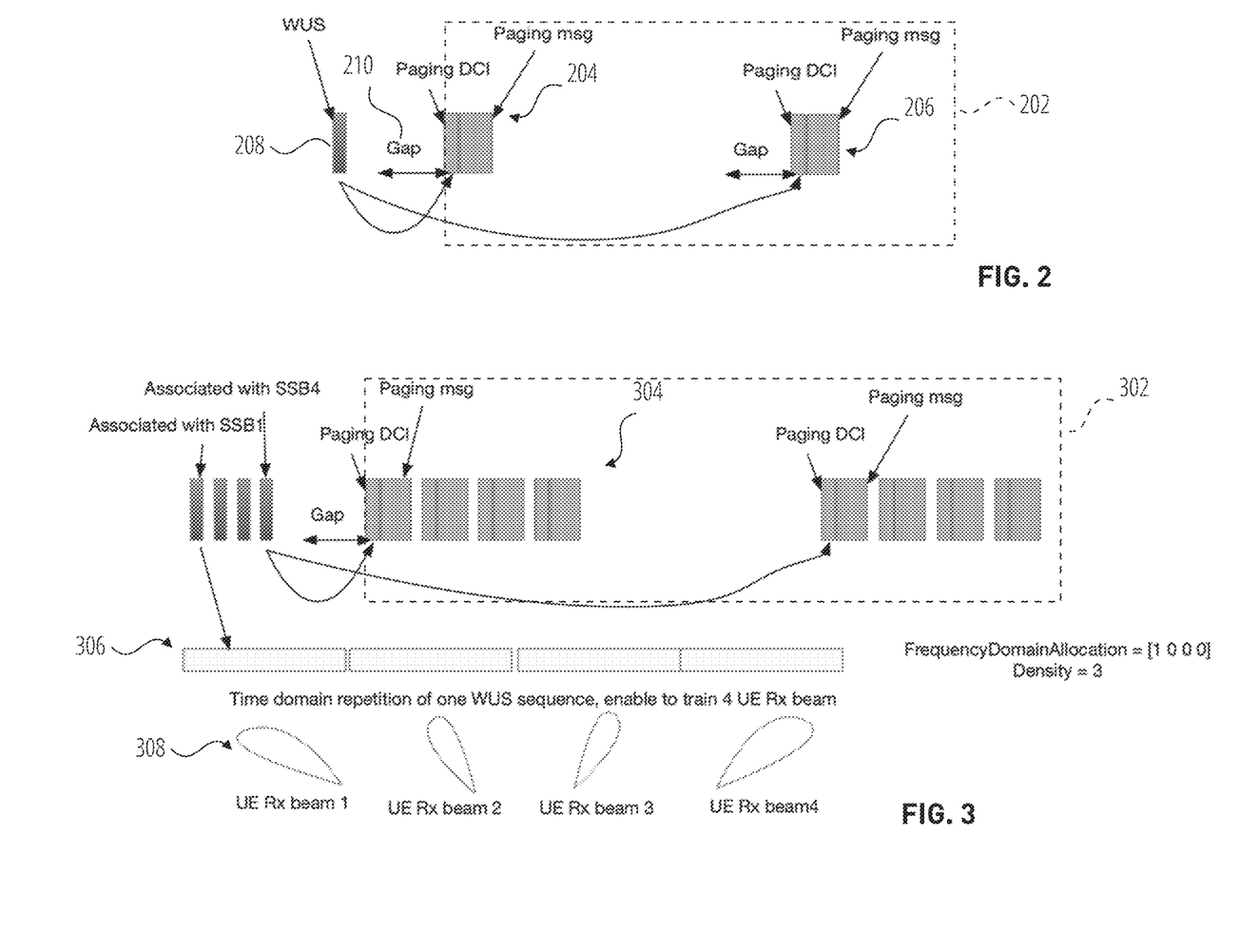
FIG. 2 is an annotated block diagram of a WUS and corresponding paging frame, according to one embodiment.
FIG. 3 is an annotated block diagram of a WUS and corresponding paging frame, according to one embodiment.

The number of CSI-RS ports is configured to correspond to the number of paging occasions within a paging frame, thereby mapping one CSI-RS port into one paging occasion. If Ns equals one, then the number of CSI-RS ports is one; if Ns equals two, then the number of CSI-RS ports is two; and so forth. For example, FIG. 2 shows a Paging frame 202. There are two paging occasions within Paging frame 202, i.e., Paging occasion 204 and Paging occasion 206, in which case there are two CSI-RS ports. A WUS 208 is configured per (each) Paging frame 202, and different numbers of paging occasions may be configured for different paging frames.

In some embodiments, two or four CSI-RS ports can reuse code division multiplexing (CDM) configuration in the CSI-RS configuration. CDM uses the orthogonality of a random sequence to carry information. In the context of WUS, one random sequence corresponds to one WUS. Different random sequence is transmitted over the same time/frequency resources. For instance, within the four ports. CDM allows for occupying the same resource and differentiating by code rate so to differentiate coding sequence. In another embodiment, the resources can be divided by frequency division multiplexing (FDM).

WUS 208 is sent at least a minimum gap 210 before the paging frame to allow the UE to decode and process WUS 208 to decide whether to wake up or not. A UE detects presence of CSI-RS per port configuration for detection of WUS 208. Even though a WUS may be configured with four ports, each individual UE may receive and detect one port. A UE may monitor just one paging occasion out of the entire DRX cycle, so the UE wakes up and then receive WUS 208 for its particular configured port to detect whether that port carries a pre-configured sequence. If the sequence is received, then the UE waits for its corresponding paging occasion to receive it. If the sequence is not received, the UE will go back to sleep. In the example of FIG. 2. WUS 208 includes two ports for Paging occasion 204 and Paging occasion 206, which correspond to two different UEs configured for the different ports.

In another embodiment, detection of WUS can also indicate the presence of pre-configured TRS ahead of paging frame or each paging occasion. If not WUS is transmitted, then no TRS is transmitted. This minimizing (fixed) system overhead impact by providing potential TRS/CSI-RS occasions available in connected mode to idle/inactive mode UEs. Note that always-on TRS/CSI-RS transmission by gNB need not be performed when WUS enables on-demand TRS/CSI-RS transmission.

Due to various network deployment and support of different UE type (Reduce Capacity UE, Extended coverage UE, etc.), WUS sequence configuration is performed. For instance, the WUS location and sequence length is configured by additional RRC signaling including "WUS-config-r17" in RadioResourceCommonSIB. The WUS-Config-r17 configures number of CSI-RS/SSS symbols in WUS resource set, frequency location, number of ports, port to paging occasion mapping, CDM configuration.

WUS-config-r17 may also configure whether trs-info is true or not. In case the WUS serves as TRS, this field indicates WUS uses TRS format. If this field is false, WUS can be indication that the TRS will be transmitted in the pre-configured location after this WUS.

WUS-config-r17 may also configure timeOffsetDRX to indicate a minimum time offset to start of paging occasion. If this field in true, UE can perform time/frequency estimation using WUS sequence itself.

FIG. 3 shows another embodiment for implementing WUS in FR2 with UE beam scanning, in which one CSI-RS with multiple ports is employed for a wideband WUS design based on the CSI-RS/TRS configuration.

When beam scanning is used, a same WUS is transmitted per Transmission Configuration Indicator (TCI) with SSB, similar to paging occasions, for each beam direction. For example, FIG. 3 shows a paging frame 302 including two paging occasions 304. With CSI-RS-based WUS, by proper configuration of "frequencyDomainAllocation" parameters in CSI-RS-resourceMapping configuration, UE receive (Rx) beam scanning within an OFDM symbol can be enabled. With frequency domain down sampling, the gNB ensures there is one sending tone and other tones are empty to create time-domain repetition of sequence 306. UE trains Rx beam 308 for each transmit (Tx) beam (SSB TCI state). Then it may use the best Rx beam trained from WUS to receive corresponding PDCCH and PDSCH in paging occasions 304.

The UE can also combine repeated copies of the same paging occasion to enhance performance for both WUS detection and paging occasion receiving. As shown in FIG. 3, there are two paging occasions and each is transmitted using four beam directions. Thus, the paging message is repeated four times (one time for each beam).

As explained previously, detection of WUS can also indicate the presence of TRS in pre-configured location before paging occasion.

WUS-config-r17 may configure the parameters discussed above with reference to FIG. 2. An additional parameter in WUS-config-r17 for FR2 is EnableRxBeam Search. If this field is true, repeated sequence per Tx beam is sent to allow UE perform Rx beam training per Tx beam.

Figures 4, 5:
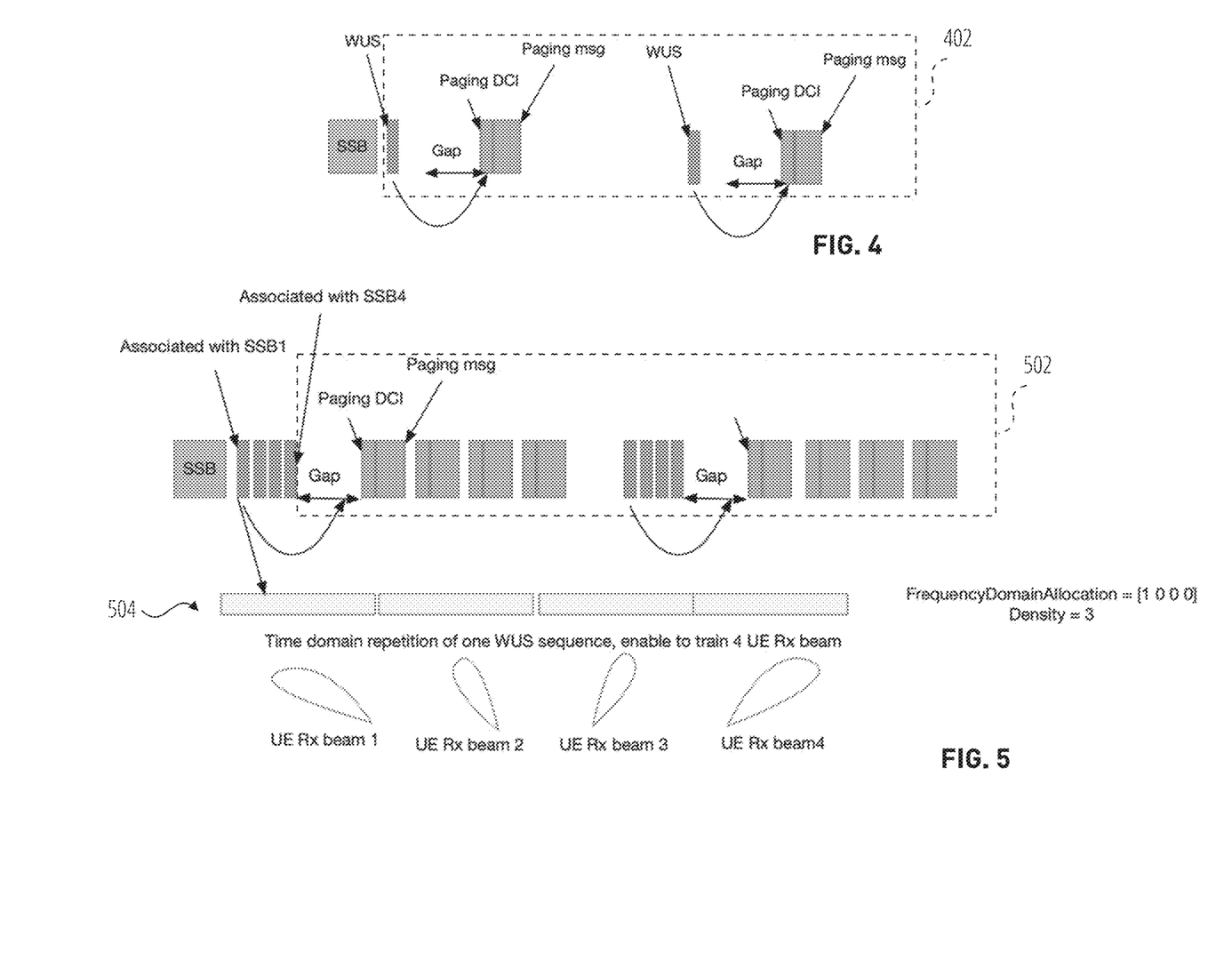
FIG. 4 is an annotated block diagram of a WUS and corresponding paging frame, according to one embodiment.
FIG. 5 is an annotated block diagram of a WUS and corresponding paging frame, according to one embodiment.

FIG. 4 shows another embodiment for implementing WUS in FR 1 or FR2, in which multiple CSI-RS are employed for a wideband WUS design based on the CSI-RS/TRS configuration. For example, each WUS may comprise one OFDM symbol, with density of one or three at 20 MHz bandwidth. In another embodiment, a WUS is two OFDM symbol, separated by four OFDM symbols in between, similar to TRS structure.

In contrast to the embodiment of FIG. 2, FIG. 4 shows a paging frame 402 including two paging occasions and multiple WUS in which each WUS is associated per paging occasion instead of per paging frame. Thus, there are multiple CSI-RS configurations, one for each paging occasion, with one port per CSI-RS configuration. The location of each WUS is configured per paging occasion. As described previously, each WUS is at least gap ahead of the corresponding paging occasion within the paging frame.

Detection of WUS can also indicate the presence of TRS in pre-configured location before each paging occasion.

WUS-config-r17 may configure the parameters discussed above with reference to FIG. 2.

FIG. 5 shows a paging frame 502 for which multiple CSI-RS correspond to multiple WUS in FR2. As described previously with reference to the embodiment of FIG. 3, same WUS is transmitted per TC with SSB. In contrast to the embodiment of FIG. 3, each CSI-RS configuration is associated per paging occasion instead of per paging frame.

For each CSI-RS configuration, proper configuration of "frequencyDomainAllocation" parameters in CSI-RS-resourceMapping configuration, UE Rx beam scanning within an OFDM symbol can be enabled. The gNB ensure other tones are empty to create time domain repetition of sequence 504. The UE can train Rx beam for each Tx beam (SSB TCI state). Then it may use the best Rx beam trained from WUS to receive corresponding PDCCH and PDSCH in paging occasion.

UE can also combine different copy of the same paging occasion to enhance performance for both WUS detection and paging occasion receiving.

Detection of WUS can also indicate the presence of TRS in pre-configured location before a paging occasion.

WUS-config-r17 may configure the parameters discussed above with reference to FIG. 2. An additional parameter in WUS-config-r17 for FR2 is EnableRxBeamSearch. If this field is true, repeated sequence per TX beam is sent to allow UE perform RX beam training per Tx beam.

Figure 6:
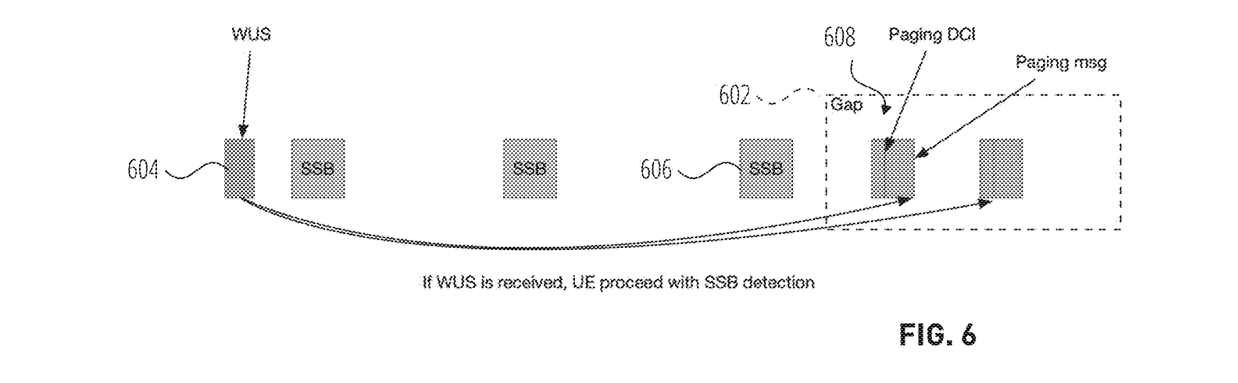
FIG. 6 is an annotated block diagram of a WUS and corresponding paging frame, according to one embodiment.

FIG. 6 shows an example of a paging frame 602 a employing an SSS 604 for WUS. SSS-based WUS enables narrowband receiving, without SSB detection for potentially larger power saving gains.

A UE can further use a last SSB 606 before a paging occasion 608 to refine time/frequency synchronization. In another embodiment, if a potential position of TRS is configured before paging occasion 608, the UE can use the TRS to refine time/frequency synchronization.

Different SSB sequence can be multiplexed within one WUS timing location, with 1:1 sequence mapping to paging occasion. Different orthogonal sequences are CDMed together, which is similar to the previously described CDM of different CSI-RS ports on the same time/frequency location.

The term SSB sequence generally refers to an SSS-like sequence. In NR, SSS is generated using m-sequence with cell-ID as one input parameter. Here, WUS can follow similar design of using m-sequence definition, where a paging occasion index is one of the input parameters to generate sequence, but is otherwise similar in the m-sequence definition.

When beam scanning is used, SSS-based WUS is also transmit per SSB TC state. UE beam scanning occurs from one SSS symbol to the next symbol.

WUS-config-r17 may configure the parameters discussed above with reference to FIG. 2, and including EnableRxBeamSearch for FR2 embodiments. WUS location and sequence length would vary, however, depending on whether the implementation is an SSS-based WUS or CSI-RS-based WUS.

Figure 7:
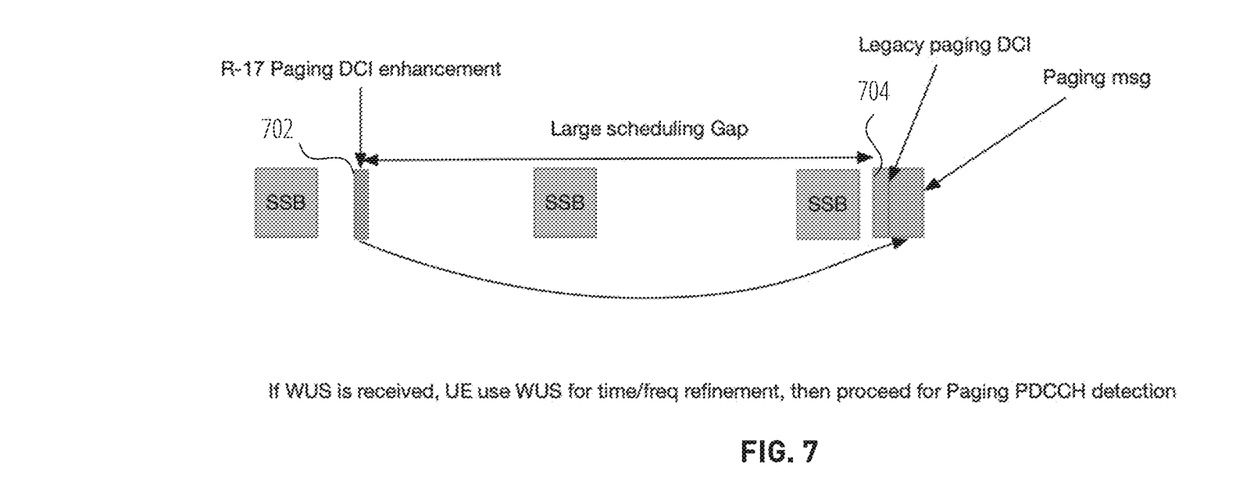
FIG. 7 is an annotated block diagram of a WUS and corresponding paging frame, according to one embodiment.

FIG. 7 shows a DCI-based WUS with relatively large scheduling gap. An enhanced DCI 702 carries UE grouping information (under discussion in RAN2). TRS scheduling information is provided, with scheduling information and short message. With a new DCI format, a Rel-17 UE need not read legacy DCI 704 scrambled by P-RNTI. Both DCIs point to same paging.

With respect to UE behavior, there is no change to legacy UE. For Rel-17 UE, the UE wakes up to detect SSB and get a rough time/frequency. The UE searches for the new WUS paging of enhanced DCI 702. If no DCI is detected, the UE will go back to sleep. If detected with the right UE subgrouping, the UE will further refine time/frequency using either SSB, or TRS (if carried using this new WUS enhanced DCI 702), then it may decode paging message. In other words, UE grouping is mapped to paging occasion. Within one paging occasion, further subgrouping is currently under discussion.

FIG. 8 shows the location of the new DCI can be signaled in SIB1, PCCH-Config 802. The WUSPDCCH DCI search space is derived from previous paging DCI search space configuration with a configured offset. The offset field is signaled using firstWUSPDCCH-offset-MonitoringOccasionOfPO 804 for enhanced DCI 702 (FIG. 7).

AMF and RAN configuration for the CSR-RS-, SSS-, and DCI-based WUS embodiments is as follows.

For an RRC-idle UE, AMF sends RAN paging assisted information including WUS assistance information. The WUS assistance information indicates whether UE supports WUS, whether UE support Rx beam sweeping for WUS receiving in FR2, and sub-grouping information if grouping is based on traffic or device type.

RAN paging assisted information also includes assisted information for coverage extended UE or Reduced Capacity (RedCap) UE. This assisted information includes, for example, DCI coverage related parameters such as max number of aggregation level, PDCCH repetition, and other DCI coverage related parameters. The assisted information also includes PDSCH coverage related parameters such as PDSCH repetition, TBS scaling, and other parameters.

For an RRC-idle UE, the UE context is saved in the gNB when UE is suspended. When UE moves out of area, RAN notification area update procedure is triggered when UE moves, and the gNB will forward related UE context to the next gNB including WUS info, coverage information.

Figure 9:
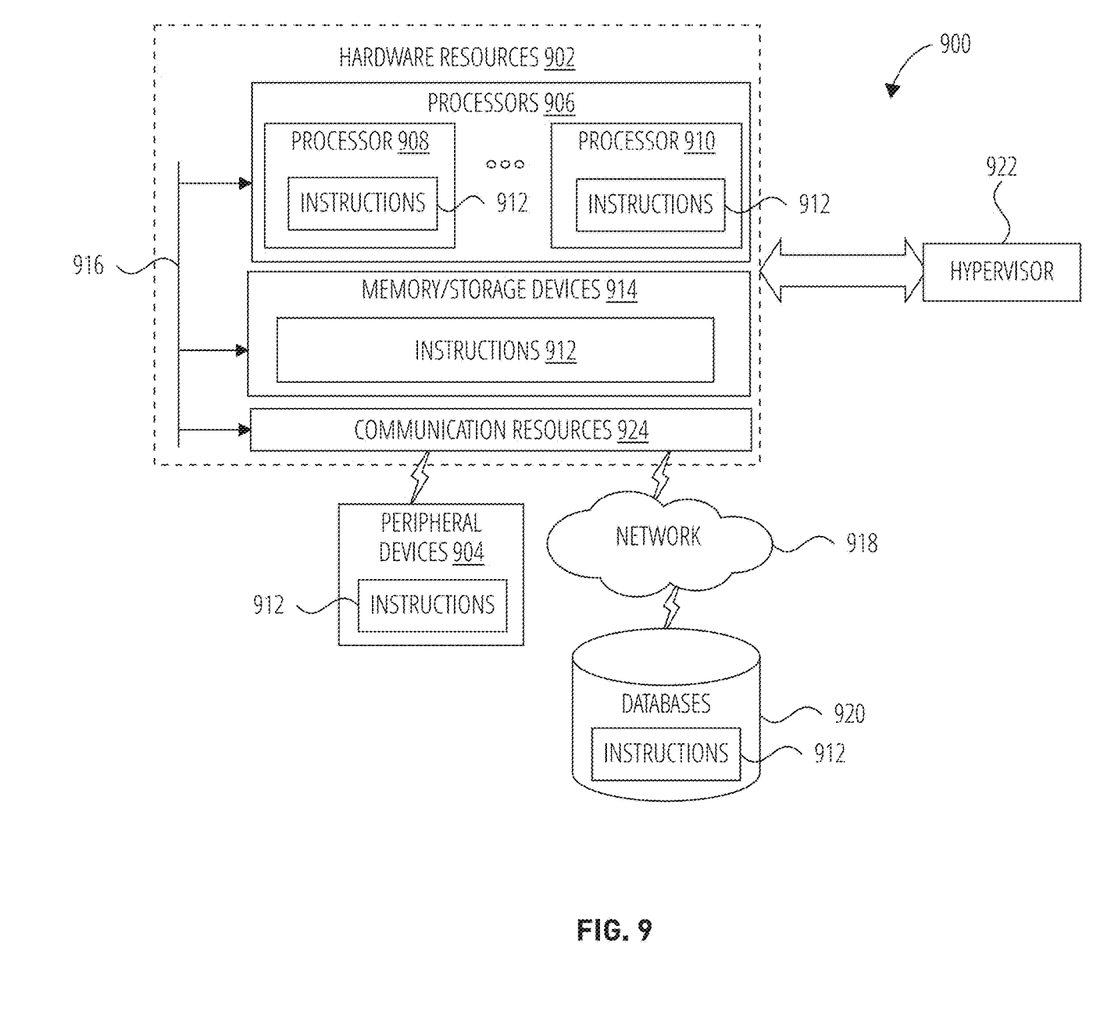
FIG. 9 is a block diagram, according to one embodiment.

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 906 (or processor cores), one or more memory/storage devices 914, and one or more communication resources 924, each of which may be communicatively coupled via a bus 916. For embodiments where node virtualization (e.g., NFV) is utilized, a hypervisor 922 may be executed to provide an execution environment for one or more network slices/sub-slices to utilize the hardware resources 902.

The processors 906 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 908 and a processor 910.

The memory/storage devices 914 may include main memory, disk storage, or any suitable combination thereof. The memory/storage devices 914 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 924 may include interconnection or network interface components or other suitable devices to communicate with one or more peripheral devices 904 or one or more databases 920 via a network 918. For example, the communication resources 924 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 912 may comprise software, a program, an application, an applet, an app, or other executable code for causing at least any of the processors 906 to perform any one or more of the methodologies discussed herein. The instructions 912 may reside, completely or partially, within at least one of the processors 906 (e.g., within the processor's cache memory), the memory/storage devices 914, or any suitable combination thereof. Furthermore, any portion of the instructions 912 may be transferred to the hardware resources 902 from any combination of the peripheral devices 904 or the databases 920. Accordingly, the memory of the processors 906, the memory/storage devices 914, the peripheral devices 904, and the databases 920 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method, performed by a user equipment (UE), of wake-up signal (WUS) detection for facilitating paging in a wireless communication system, the method comprising: receiving from a next generation Node B (gNB) configuration information indicating a channel state information (CSI)-reference signal (RS) port corresponding to a paging occasion in a paging frame; detecting presence of a WUS in the CSI-RS port corresponding to the paging occasion; and attempting to decode a sequence of the WUS received via resources of the CSI-RS port to determine whether the paging occasion includes a paging message for the UE.

Example 2 is the method of Example 1, in which the paging frame includes multiple paging occasions corresponding to multiple CSI-RS ports, and the configuration information maps one of the multiple paging occasions to one of the multiple CSI-RS ports.

Example 3 is the method of Example 2, in which the multiple CSI-RS ports are configured to use code division multiplexing (CDM).

Example 4 is the method of Example 1, in which the detecting presence of the WUS indicates presence of a pre-configured tracking reference signal (TRS) ahead of the paging frame or ahead of each paging opportunity in the paging frame.

Example 5 is the method of Example 1, further comprising receiving a WUS transmitted per Transmission Configuration Indicator (TCI) for each of multiple UE beam directions.

Example 6 is the method of Example 1, further comprising receiving a repeated WUS sequence in a beam scan.

Example 7 is the method of Example 1, in which the paging frame includes multiple paging occasions, and each one of the multiple paging occasions corresponds to a different CSI-RS configuration.

Example 8 is the method of Example 1, in which the configuration information includes a WUS-config-r17 parameter in RadioResourceCommonSIB.

Example 9 is a method, performed by a user equipment (UE), of wake-up signal (WUS) detection for facilitating paging in a wireless communication system, the method comprising: receiving from a next generation Node B (gNB) configuration information indicating a secondary synchronization signal (SSS)-like sequence corresponding to a paging occasion in a paging frame; detecting presence of a WUS in a SSS corresponding to the paging occasion; and attempting to decode the SSS-like sequence of the WUS received via resources of the SSS to determine whether the paging occasion includes a paging message for the UE.

Example 10 is the method of Example 9, in which the WUS is associated with multiple paging occasions.

Example 11 is the method of Example 9, further comprising refining time and frequency tracking based on a last Synchronization Signal Block (SSB) before the paging opportunity.

Example 12 is the method of Example 9, in which the detecting presence of the WUS indicates presence of a pre-configured tracking reference signal (TRS) ahead of the paging frame or ahead of each paging opportunity in the paging frame.

Example 13 is the method of Example 9, further comprising receiving the WUS transmit per Synchronization Signal Block (SSB) Transmission Configuration Indicator (TCI) state.

Example 14 is the method of Example 9, in which the configuration information includes a WUS-config-r17 parameter in RadioResourceCommonSIB.

Example 15 is a method, performed by a user equipment (UE), of wake-up signal (WUS) detection for facilitating paging in a wireless communication system, the method comprising: detecting a Synchronization Signal Block (SSB) for time and frequency tracking; searching for a WUS in downlink control information (DCI) corresponding to a paging occasion in a paging frame, the DCI including subgrouping information; in response to detecting the WUS, checking the subgrouping information; and in response to the subgrouping information applying to the UE, attempting to decode a paging message at the paging occasion.

Example 16 is the method of Example 15, in which a location of the DCI is signaled in system information block one (SIB)1. PCCH-Config information.

Example 17 is the method of Example 15, in which a search space for the DCI is derived from PCCH-Config information including firstWUSPDCCH-offset-MonitoringOccasionOfPO.

Example 18 is the method of Example 15, further comprising, in response to in response to the subgrouping information applying to the UE, further refining time and frequency tracking using a tracking reference signal (TRS).

Example 19 is the method of Example 15, in which a scheduling gap between the DCI and paging opportunity includes one or more SSBs.

Example 20 is a non-transitory computer-readable storage medium, the computer-readable storage medium including instructions that when executed by a computer, cause the computer to: receive from a next generation Node B (gNB) configuration information indicating a channel state information (CSI)-reference signal (RS) port corresponding to a paging occasion in a paging frame; detect presence of a WUS in the CSI-RS port corresponding to the paging occasion; and attempt to decode a sequence of the WUS received via resources of the CSI-RS port to determine whether the paging occasion includes a paging message for the UE.

Example 21 is the computer-readable storage medium of Example 20, in which the page frame includes multiple paging occasions corresponding to multiple CSI-RS ports, and the configuration information maps one of the multiple paging occasions to one of the multiple CSI-RS ports.

Example 22 is the computer-readable storage medium of Example 21, in which the multiple CSI-RS ports are configured to use code division multiplexing (CDM).

Example 23 is the computer-readable storage medium of Example 20, in which the presence of the WUS indicates presence of a pre-configured tracking reference signal (TRS) ahead of the paging frame or ahead of each paging opportunity in the paging frame.

Example 24 is the computer-readable storage medium of Example 20, in which the instructions further configure the computer to receive a WUS transmitted per Transmission Configuration Indicator (TCI) for each of multiple UE beam directions.

Example 25 is the computer-readable storage medium of Example 20, in which the instructions further configure the computer to receive a repeated WUS sequence in a beam scan.

Example 26 is the computer-readable storage medium of Example 20, in which the page frame includes multiple paging occasions, and each one of the multiple paging occasions corresponds to a different CSI-RS configuration.

Example 27 is the computer-readable storage medium of Example 20, in which the configuration information includes a WUS-config-r17 parameter in RadioResourceCommonSIB.

Example 28 is a non-transitory computer-readable storage medium, the computer-readable storage medium including instructions that when executed by a computer, cause the computer to: receive from a next generation Node B (gNB) configuration information indicating a secondary synchronization signal (SSS)-like sequence corresponding to a paging occasion in a paging frame; detect presence of a WUS in a SSS corresponding to the paging occasion; and attempt to decode the SSS-like sequence of the WUS received via resources of the SSS to determine whether the paging occasion includes a paging message for the UE.

Example 29 is the computer-readable storage medium of Example 28, in which the WUS is associated with multiple paging occasions.

Example 30 is the computer-readable storage medium of Example 28, in which the instructions further configure the computer to refine time and frequency tracking based on a last Synchronization Signal Block (SSB) before the paging opportunity.

Example 31 is the computer-readable storage medium of Example 28, in which the detecting presence of the WUS indicates presence of a pre-configured tracking reference signal (TRS) ahead of the paging frame or ahead of each paging opportunity in the paging frame.

Example 32 is the computer-readable storage medium of Example 28, in which the instructions further configure the computer to receive the WUS transmit per Synchronization Signal Block (SSB) Transmission Configuration Indicator (TCI) state.

Example 33 is the computer-readable storage medium of Example 28, in which the configuration information includes a WUS-config-r17 parameter in RadioResource-CommonSIB.

Example 34 is a non-transitory computer-readable storage medium, the computer-readable storage medium including instructions that when executed by a computer, cause the computer to: detect a Synchronization Signal Block (SSB) for time and frequency tracking; search for a WUS in downlink control information (DCI) corresponding to a paging occasion in a paging frame, the DCI including subgrouping information; in response to detecting the WUS, check the subgrouping information; and in response to the subgrouping information apply to the UE, attempting to decode a paging message at the paging occasion.

Example 35 is the computer-readable storage medium of Example 34, in which a location of the DCI is signaled in system information block one (SIB)1, PCCH-Config information.

Example 36 is the computer-readable storage medium of Example 34, in which a search space for the DCI is derived from PCCH-Config information include first WUSPDCCH-offset-MonitoringOccasionOfPO.

Example 37 is the computer-readable storage medium of Example 34, in which the instructions further configure the computer to, in response to in response to the subgrouping information apply to the UE, further refining time and frequency tracking using a tracking reference signal (TRS).

Example 38 is the computer-readable storage medium of Example 34, in which a scheduling gap between the DCI and page opportunity includes one or more SSBs.

Example 39 may include an apparatus comprising means to perform one or more elements of a method described in or related to any of the above Examples, or any other method or process described herein.

Example 40 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 41 may include an apparatus comprising logic, modules, or circuitry to perform one or more elements of a method described in or related to any of the above Examples, or any other method or process described herein.

Example 42 may include a method, technique, or process as described in or related to any of the above Examples, or portions or parts thereof.

Example 43 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 44 may include a signal as described in or related to any of the above Examples, or portions or parts thereof.

Example 45 may include a datagram, packet, frame, segment, protocol data unit (PDU), or message as described in or related to any of the above Examples, or portions or parts thereof, or otherwise described in the present disclosure.

Example 46 may include a signal encoded with data as described in or related to any of the above Examples, or portions or parts thereof, or otherwise described in the present disclosure.

Example 47 may include a signal encoded with a datagram, packet, frame, segment, PDU, or message as described in or related to any of the above Examples, or portions or parts thereof, or otherwise described in the present disclosure.

Example 48 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 49 may include a computer program comprising instructions, wherein execution of the program by a processing element is to cause the processing element to carry out the method, techniques, or process as described in or related to any of the above Examples, or portions thereof.

Example 50 may include a signal in a wireless network as shown and described herein.

Example 51 may include a method of communicating in a wireless network as shown and described herein.

Example 52 may include a system for providing wireless communication as shown and described herein.

Example 53 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a user equipment (UE), of wake-up signal (WUS) detection for facilitating paging in a wireless communication system, the method comprising:
   receiving from a next generation Node B (gNB) configuration information indicating a channel state information (CSI)-reference signal (RS) port corresponding to a paging occasion in a paging frame;
   detecting presence of a WUS in the CSI-RS port corresponding to the paging occasion; and
   attempting to decode a sequence of the WUS received via resources of the CSI-RS port to determine whether the paging occasion includes a paging message for the UE.

2. The method of claim 1, in which the paging frame includes multiple paging occasions corresponding to multiple CSI-RS ports, and the configuration information maps one of the multiple paging occasions to one of the multiple CSI-RS ports.

3. The method of claim 2, in which the multiple CSI-RS ports are configured to use code division multiplexing (CDM).

4. The method of claim 1, in which the detecting presence of the WUS indicates presence of a pre-configured tracking reference signal (TRS) ahead of the paging frame or ahead of each paging opportunity in the paging frame.

5. The method of claim 1, further comprising receiving a WUS transmitted per Transmission Configuration Indicator (TCI) for each of multiple UE beam directions.

6. The method of claim 1, further comprising receiving a repeated WUS sequence in a beam scan.

7. The method of claim 1, in which the paging frame includes multiple paging occasions, and each one of the multiple paging occasions corresponds to a different CSI-RS configuration.

8. The method of claim 1, in which the configuration information includes a WUS-config-r17 parameter in RadioResourceCommonSlB.

9. A method, performed by a user equipment (UE), of wake-up signal (WUS) detection for facilitating paging in a wireless communication system, the method comprising:
   receiving from a next generation Node B (gNB) configuration information indicating a secondary synchronization signal (SSS)-like sequence corresponding to a paging occasion in a paging frame;
   detecting presence of a WUS in a SSS corresponding to the paging occasion; and
   attempting to decode the SSS-like sequence of the WUS received via resources of the SSS to determine whether the paging occasion includes a paging message for the UE.

10. The method of claim 9, in which the WUS is associated with multiple paging occasions.

11. The method of claim 9, further comprising refining time and frequency tracking based on a last Synchronization Signal Block (SSB) before the paging opportunity.

12. The method of claim 9, in which the detecting presence of the WUS indicates presence of a pre-configured tracking reference signal (TRS) ahead of the paging frame or ahead of each paging opportunity in the paging frame.

13. The method of claim 9, further comprising receiving the WUS transmit per Synchronization Signal Block (SSB) Transmission Configuration Indicator (TCI) state.

14. The method of claim 9, in which the configuration information includes a WUS-config-r17 parameter in RadioResourceCommonSlB.

15. A method, performed by a user equipment (UE), of wake-up signal (WUS) detection for facilitating paging in a wireless communication system, the method comprising:
   detecting a Synchronization Signal Block (SSB) for time and frequency tracking;
   searching for a WUS in downlink control information (DCI) corresponding to a paging occasion in a paging frame, the DCI including subgrouping information;
   in response to detecting the WUS, checking the subgrouping information; and
   in response to the subgrouping information applying to the UE, attempting to decode a paging message at the paging occasion.

16. The method of claim 15, in which a location of the DCI is signaled in system information block one (SIB)1, PCCH-Config information.

17. The method of claim 15, in which a search space for the DCI is derived from PCCH-Config information including first WUSPDCCH-offset-MonitoringOccasionOfPO.

18. The method of claim 15, further comprising, in response to the subgrouping information applying to the UE, further refining time and frequency tracking using a tracking reference signal (TRS).

19. The method of claim 15, in which a scheduling gap between the DCI and paging opportunity includes one or more SSBs.

* * * * *